United States Patent [19]

Czekaj

[11] Patent Number: 5,742,141

[45] Date of Patent: Apr. 21, 1998

[54] SEMI-AUTONOMOUS PARKING CONTROL SYSTEM FOR A VEHICLE PROVIDING TACTILE FEEDBACK TO A VEHICLE OPERATOR

[75] Inventor: James L. Czekaj, Northville, Mich.

[73] Assignee: Ford Motor Company, Dearborn, Mich.

[21] Appl. No.: 658,113

[22] Filed: Jun. 4, 1996

[51] Int. Cl.$^6$ .................................................. B64C 13/18
[52] U.S. Cl. .......................... 318/587; 318/580; 180/204; 180/199; 180/167; 364/424.01; 364/426.01; 364/460
[58] Field of Search .................. 180/204, 167, 180/199; 364/424.01, 449, 436, 460, 461, 424.1, 424.05, 426.01; 318/587, 580, 560, 581

[56] References Cited

U.S. PATENT DOCUMENTS

| | | | |
|---|---|---|---|
| 4,735,274 | 4/1988 | Good et al. | 180/204 |
| 4,745,985 | 5/1988 | Nakayama et al. | 180/142 |
| 4,919,224 | 4/1990 | Shyu et al. | 180/167 |
| 4,931,930 | 6/1990 | Shyu et al. | 180/204 |
| 4,936,402 | 6/1990 | White, Jr. | 180/132 |
| 5,295,551 | 3/1994 | Sukonick | 180/167 |
| 5,505,119 | 4/1996 | Phillips | 91/375 R |

OTHER PUBLICATIONS

SAE Technical Paper 941000, D. Gorinevsky, A. Kapitanovsky and A. Goldberg, AUTOPASS: Automated Parking Support System, Feb. 28, 1994.

*Primary Examiner*—John W. Cabeca
*Attorney, Agent, or Firm*—Roger L. May; Paul K. Godwin

[57] ABSTRACT

A semi-autonomous parking system calculates the current position as well as the desired trajectory required to accomplish the parking task by utilizing vehicle position measurements. The parking system alters the power steering's required effort to maneuver the vehicle thus providing tactile feedback to the vehicle operator. The required effort is decreased when it is determined that the operator is steering the vehicle within the desired trajectory and is increased when it is determined that the operator is steering the vehicle outside the desired trajectory. The operator can feel increases and decreases in steering effort at the steering wheel.

10 Claims, 2 Drawing Sheets

SEMI-AUTONOMOUS PARKING CONTROL SYSTEM FOR A VEHICLE PROVIDING TACTILE FEEDBACK TO A VEHICLE OPERATOR

FIELD OF THE INVENTION

This invention relates generally to vehicles, and, more particularly, to parking aids for making parking in parking spaces less burdensome.

BACKGROUND OF THE INVENTION

Parking a vehicle can be an arduous task, especially when trying to parallel park or back into a space between parked vehicles or other obstacles. A recently developed automated parking support system facilitates parallel parking of a vehicle as well as several other types of parking. When engaged, the system performs sensory based acquisition processing of information about the vehicle environment using range finding sensors mounted on the vehicle perimeter. It computes a parking program which is a required sequence of wheel steering angles and an optimum parking trajectory for the initial and final parking conditions detected by the sensors. To actually park the vehicle using the computed parking program, the automated parking support system utilizes one of two alternative devices. The first device is mounted on the vehicle and contains a display screen that displays a deviation of the steering angle from the required value as determined by the parking program. In response to the displayed information, the vehicle operator performs the required parking motion by steering so that the indicator is kept close to zero. The second device is a fully automated system that does not require any operator involvement because the vehicle is steered automatically using a computer controlled mechanism. The operator merely brings the vehicle into the vicinity of a standard initial parking position and engages the automated parking control system. Unfortunately, with these devices there is no correlation between operator effort and vehicle movement. With one device the parking operation is fully automated. With the other device the parking operation requires monitoring the display screen which is difficult to do when looking to the rear while parking, and the operator feels no change in steering effort. Accordingly, it will be appreciated that it would be highly desirable to have a parking control system that physically correlates operator effort to the steering effort required.

SUMMARY OF THE INVENTION

The present invention is directed to overcoming one or more of the problems set forth above. Briefly summarized, according to one aspect of the present invention, a method for parking a vehicle, comprises engaging a semi-autonomous parking system providing tactile feedback, receiving inputs from sensors, determining vehicle position, calculating desired and actual vehicle trajectories, comparing the trajectories to determine a trajectory error, determining a trajectory error tolerance, and determining whether the trajectory error is decreasing.

According to the method, the current' position as well as the desired trajectory required to accomplish the parking task are calculated by utilizing vehicle position measurements. The power steering's required effort to maneuver the vehicle is altered thus providing feedback to the vehicle operator. The required effort is decreased when it is determined that the operator is steering the vehicle within the desired trajectory and is increased when it is determined that the operator is steering the vehicle outside the desired trajectory. The operator can feel increases and decreases in steering effort at the steering wheel giving the operator assurance that he is in control.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
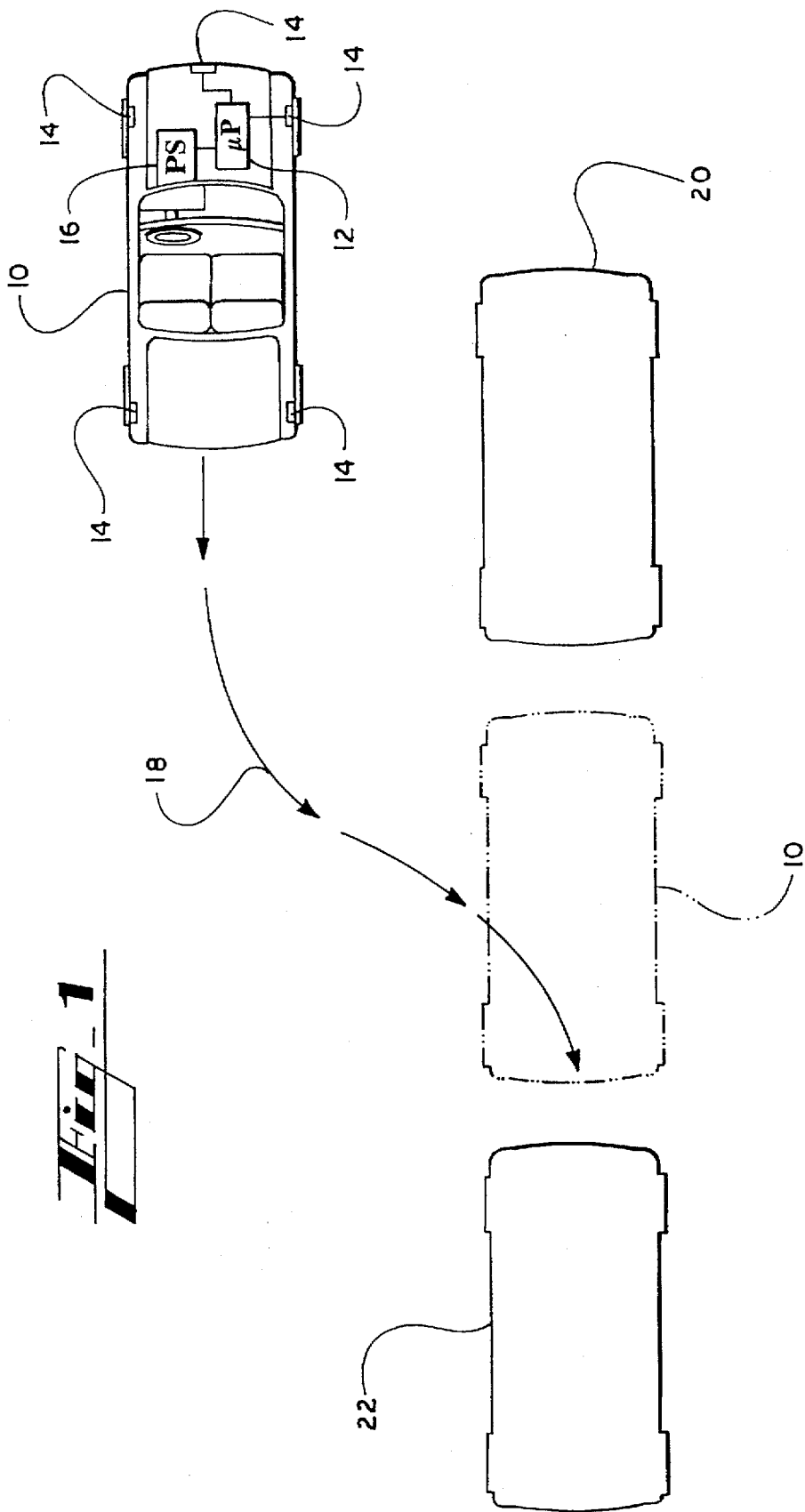
FIG. 1 a diagram illustrating a trajectory along which a vehicle equipped with a parking control system is parked between two parked vehicles.

Referring to FIG. 1, a vehicle 10 is equipped with a semi-autonomous parking control system that provides tactile feedback to the vehicle operator. The parking control system includes a microprocessor based computer 12 that receives inputs from various sensors 14 mounted on the vehicle 10 and delivers outputs to the power steering system 16. The parking control system and powers steering system cooperate to propel the vehicle along a trajectory 18 to park it between two other parked vehicles 20, 22. The computer 12 uses positional information from the sensors 14 to calculate a desired trajectory and compares the desired trajectory with the actual trajectory of the vehicle. The computer increases and decreases the steering effort to guide the vehicle along the trajectory and the changes in steering effort are felt by the operator while steering.

Figure 2:
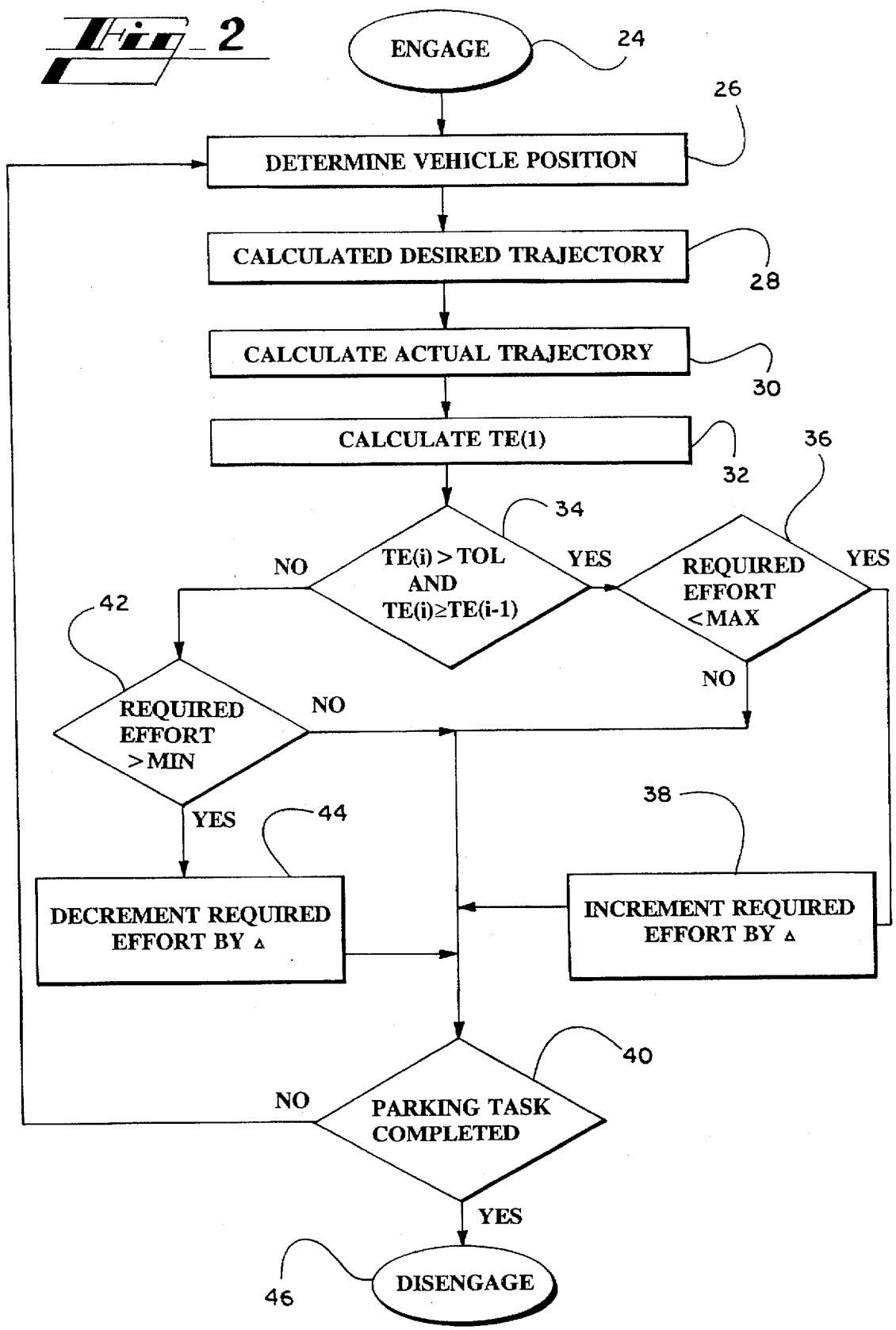
FIG. 2 is a flow chart illustrating operation of the parking control system of FIG. 1.

Referring to FIG. 2, the semi-automated parking control system is engaged at block 24 in any convenient manner, such as by operating a switch or by sensing reverse gear selection in combination with low vehicle speed which is the case when backing into a parking space. Vehicle position is determined at block 26 with respect to the other parked vehicles 20, 22 or with respect to curbs or obstacles. The sensors 14 used may be optical sensors, such as cameras, acoustical sensors, such as ultrasonic sensors, or may be radar based. Other types of sensors that can give an indication of distance or position can also be used.

Once the vehicle position data is gathered, a desired vehicle trajectory is calculated at block 28 based on the measured position data and any derived information, such as vehicle velocity for example. Other information, such as acceleration for example, can be determined from the position data measurements, or position can be determined from relative velocity measurements. The solution trajectory is a trajectory that parks the vehicle in the parking space and can be derived by any number of methods, such as state space control system modeling, neural network controller, or fuzzy logic, for example. The computer 12 stores measured and derived data in its memory along with other parking data. Computer 12 need not be separate from the vehicle onboard computer and is preferably the same.

At block 30 the actual vehicle trajectory is calculated. The actual vehicle trajectory is the path the vehicle follows under the control of the operator and can be computed from the measured and derived data.

A trajectory error, TE(i), for the current time step is computed at block 32. This error could be one of several possible metrics used to indicate the deviation of the actual trajectory computed at block 30 from the desired trajectory computed at block 28. A trajectory error indicates that the actual vehicle trajectory under the control of the operator deviates from the desired trajectory and will not result in correct parking without correction. Therefore, at decision block 34 a query is made regarding two conditions. First, it is determined whether the trajectory error, TE(i), is greater than a predetermined tolerance, TOL; that is, is TE(i)>TOL? Second, it is determined whether the trajectory error, TE(i), is decreasing; that is, has the trajectory error decreased since the last time step: is TE(i)≧TE(i−1)? The trajectory error for the current time step is compared with the trajectory error for the previous time step to determine whether the error is decreasing. On initialization, the computer 12 may assign a value for the trajectory error or may use the value for the current time step just calculated at block 32 as the value for the previous time step. Thereafter, actual values are available for use.

When the trajectory error is greater than the predetermined tolerance and the trajectory error is not decreasing, then at block 36 it is determined whether the required steering effort is less than a predetermined maximum steering effort, MAX. At decision block 36 the system tests to see if the load on the steering wheel, referred to as required effort, is less than MAX. If so, then at block 38 the system increments the required power, steering effort by a predetermined amount, Δ, thus requiring more effort on the part of the operator to steer the vehicle. After incrementing, the system advances the process to decision block 40. If the required effort as decision block 36 is not less than MAX, the required effort is not increased further at this time step thereby allowing the operator to steer outside the computed trajectory if desired. The operator may want to steer outside the computed trajectory when vehicles 20, 22 are not parked correctly or parked too far from the curb. The system will respond during the next time step by computing a new desired trajectory based on the then current vehicle position. At block 36, when the required steering effort is not less than MAX, the system advances the process to decision block 40.

On the other hand, if both conditions are not met at decision block 34, then a check is made to see if it is appropriate to reduce the required steering effort. At decision block 42 a query is made whether the required steering effort is greater than a predetermined minimum value, MIN. If so, the required steering effort is decreased by Δ at block 44. The query at block 42, Required Effort>MIN?, tests to see whether the required effort is greater than MIN, and, if so, decreases the required effort by Δ. No decrease occurs when the required effort is not greater than'MIN. From block 44 the system advances the process to decision block 40. When the required steering effort is not greater than MIN at block 42, then the system advances the process to decision block 40 where a query is made whether the parking task is completed. If so, the parking control system disengages at block 46. If not, the parking process continues for the next time step at block 26 by determining current vehicle position. Completion of the parking task may be indicated by vehicle acceleration, by the operator turning the vehicle off, or by a change in gear selection, such as a shift from reverse to drive, reverse to park, or drive to reverse by the operator.

Operation of the present invention is believed to be apparent from the foregoing description and drawings, but a few words will be added for emphasis. By employing the concept of altering the power steering mode to guide the vehicle into a parking space utilizing tactile feedback, the operator does not have to look at any indicators on the instrument panel, instead, tactile feedback is used. Other automated parking systems give no tactile feedback to the operator so that there is no feel for how hard the operator must steer to park. Predetermined settings of Δ, MAX and MIN can be stored in the computer memory. Δ is a value by which the power steering required effort will be incremented or decremented, MAX is the maximum value for required power steering effort, and MIN is the minimum value for required power steering effort. If the actual trajectory is outside the desired trajectory, then the required steering effort is increased by Δ. If the required steering effort is greater than MAX, then it is set equal to MAX. Otherwise, the required steering effort is decreased by Δ. If the required steering effort is less than MIN, then it is set equal to MIN.

It will be now appreciated that there has been presented semi-autonomous parking control system apparatus for a vehicle which provides tactile feedback to the vehicle operator. The system apparatus includes means for receiving inputs from sensors, determining vehicle position, calculating desired and actual vehicle trajectories, comparing the trajectories and determining a trajectory error, determining a trajectory error tolerance, and determining whether the trajectory error is decreasing. Also included are means for determining whether a required steering effort to maneuver the vehicle is less than a predetermined maximum steering effort, and for incrementing the required steering effort by a predetermined amount to increase required steering effort and thereby provide the tactile feedback in response the required steering effort being less than the maximum steering effort and the trajectory error exceeding the trajectory error tolerance and the trajectory error not decreasing components of the system. The system also includes means for decrementing the required steering effort by a preselected amount to decrease required steering effort and thereby provide the tactile feedback in response to the required steering effort exceeding a predetermined minimum steering effort and the trajectory error not exceeding the trajectory error tolerance or the trajectory error tolerance decreasing. Means are provided for engaging and disengaging the system, and for automatically disengaging the system when parking is complete.

The semi-autonomous parking system calculates the current position as well as the desired trajectory required to accomplish the parking task by utilizing vehicle position measurements. The parking system alters the power steering's required effort to maneuver the vehicle thus providing tactile feedback to the vehicle operator. The required effort is decreased when it is determined that the operator is steering the vehicle within the desired trajectory and is increased when it is determined that the operator is steering the vehicle outside the desired trajectory. The operator can feel increases and decreases in steering effort at the steering wheel giving the operator assurance that movement of the vehicle is in proportion to his effort.

While the invention has been described with reference to vehicles such as automobiles, it is apparent that the invention is easily adapted to other vehicles with operators desiring tactile feedback and to drivable machinery as well. While the invention has been described with particular reference to a preferred embodiment, it will be understood by those skilled in the art that various changes may be made and equivalents may be substituted for elements of the preferred embodiment without departing from invention. For example, while sensors mounted on the vehicle are preferred, it is possible to have sensors located outside the vehicle or to receive position data via satellite. In addition, many modifications may be made to adapt a particular situation and material to a teaching of the invention without departing from the essential teachings of the present invention. For example, there may be occasions when an operator wants to use the initial desired trajectory for more than one time step while using updated vehicle position data measurements for the actual trajectory. It is accordingly intended that the claims shall cover all such modifications and applications as do not depart from the true spirit and scope of the invention.

What is claimed is:

1. A method for parking a vehicle, comprising the steps of:

engaging a semi-autonomous parking control system for providing tactile feedback;

receiving inputs from sensors and determining vehicle position, and calculating desired and actual vehicle trajectories;

comparing said trajectories and determining a trajectory error;

determining a trajectory error tolerance;

determining whether said trajectory error is decreasing;

determining whether a required steering effort to maneuver said vehicle is less than a maximum steering effort when said trajectory error exceeds said trajectory error tolerance and said trajectory error is not decreasing;

incrementing said required steering effort by a predetermined amount to increase required steering effort and thereby provide said tactile feedback when said required steering effort is less than said maximum steering effort and when said trajectory error exceeds said trajectory error tolerance and said trajectory error is not decreasing;

determining whether parking is completed after incrementing said required steering effort, and returning to step of receiving inputs when parking is not complete; and determining whether parking is completed when said required steering effort is not less than said maximum steering effort, said trajectory error exceeds said trajectory error tolerance and said trajectory error is not decreasing, and returning to step of receiving inputs when parking is not complete.

2. The method of claim 1, including the steps of:

determining whether said required steering effort is greater than a minimum steering effort when said trajectory error does not exceed said trajectory error tolerance or when said trajectory error tolerance is decreasing;

decrementing said required steering effort by a preselected amount to decrease required steering effort and thereby provide said tactile feedback when said required steering effort is greater than said minimum steering effort and when said trajectory error does not exceed said trajectory error tolerance or said trajectory error tolerance is decreasing;

determining whether parking is completed after decrementing said required steering effort, and returning to step of receiving inputs when parking is not complete; and determining whether parking is completed when said required steering effort is not greater than said minimum steering effort and when said trajectory error does not exceed said trajectory error tolerance or said trajectory error tolerance is decreasing, and returning to step of receiving inputs when parking is not complete.

3. The method of claim 1 wherein the step of receiving inputs and determining vehicle position includes:

determining vehicle position with respect to parked vehicles, curbs and other objects defining a parking area.

4. The method of claim 1 wherein the step of receiving inputs and determining vehicle position includes:

determining vehicle position with respect to obstacles.

5. A method for semi-autonomously parking a vehicle, comprising the steps of:

engaging a Semi-autonomous parking control system for providing tactile feedback;

applying a steering effort by an operator to a steering wheel of a power steering system to steer said vehicle to a desired parked position;

receiving inputs from sensors and producing vehicle position data;

calculating a desired vehicle trajectory to said desired parked position using said vehicle position data;

calculating an actual vehicle trajectory to said desired parked position using said vehicle position data;

comparing said trajectories and determining a trajectory error;

determining a trajectory error tolerance;

determining whether said trajectory error is decreasing;

determining whether a required steering effort to maneuver said vehicle to said parked position along said desired vehicle trajectory is less than a maximum steering effort when said trajectory error exceeds said trajectory error tolerance and said trajectory error is not decreasing;

incrementing said required steering effort by a predetermined amount to increase operator steering effort and thereby provide said tactile feedback when said required steering effort is less than said maximum steering effort;

determining whether parking is completed after incrementing said required steering effort, and returning to step of receiving inputs when parking is not complete;

determining whether parking is completed when said required steering effort is not less than said maximum steering effort, and returning to step of receiving inputs when parking is not complete; and disengaging said parking control system when parking is completed.

6. The method of claim 5, including the steps of:

determining whether said required steering effort to maneuver said vehicle to said parked position along said desired vehicle trajectory is greater than a minimum steering effort when said trajectory error does not exceed said trajectory error tolerance or when said trajectory error tolerance is decreasing;

decrementing said required steering effort by a preselected amount to decrease operator steering effort and thereby provide said tactile feedback when said required steering effort is greater than said minimum steering effort and when said trajectory error does not exceed said trajectory error tolerance or when said trajectory error tolerance is decreasing;

determining whether parking is completed after decrementing said required steering effort, and returning to step of receiving input when parking is not complete; and determining whether parking is completed when said required steering effort is not greater than said minimum steering effort, and returning to step of receiving inputs when parking is not complete.

7. The method of claim 5 wherein the step of receiving inputs and determining vehicle position includes:

determining vehicle position with respect to parked vehicles, curbs and other objects defining a parking area.

8. The method of claim 5 wherein the step of receiving inputs and determining vehicle position includes:

determining vehicle position with respect to obstacles.

9. A semi-autonomous parking control system providing tactile feedback to an operator of a vehicle, comprising:

means for engaging and disengaging said parking control system;

means for receiving inputs from sensors, determining vehicle position, calculating desired and actual vehicle trajectories, comparing said trajectories and determining a trajectory error, determining a trajectory error tolerance, and determining whether said trajectory error is decreasing;

means for determining whether a required steering effort to maneuver said vehicle is less than a predetermined maximum steering effort;

means for incrementing said required steering effort by a predetermined amount to increase required steering effort and thereby provide said tactile feedback when said required steering effort is less than said maximum steering effort, said trajectory error exceeds said trajectory error tolerance, and said trajectory error is not decreasing; and means for disengaging said parking system when parking is complete.

10. A parking control system, as set forth in claim 9, including:

means for decrementing said required steering effort by a preselected amount to decrease required steering effort and thereby provide said tactile feedback when said required steering effort exceeds a predetermined minimum steering effort and said trajectory error does not exceed said trajectory error tolerance, and when said required steering effort exceeds said predetermined minimum steering effort and said trajectory error tolerance is decreasing.

* * * * *